Dec. 24, 1968

W. R. AMBROSE 3,418,034

DUAL VIEWING STEREOSCOPE

Filed July 3, 1967

WALTER R. AMBROSE
INVENTOR.

BY *Frank C. Parker*

ATTORNEY

United States Patent Office 3,418,034
Patented Dec. 24, 1968

3,418,034
DUAL VIEWING STEREOSCOPE
Walter R. Ambrose, Perinton, N.Y., assignor to Bausch & Lomb Incorporated, Rochester, N.Y., a corporation of New York
Filed July 3, 1967, Ser. No. 650,772
3 Claims. (Cl. 350—138)

ABSTRACT OF THE DISCLOSURE

A stereoscope used by two observers facing each other to view simultaneously a pair of corresponding photographic films such as aerial photographs, said stereoscope embodying a pair of similar optical systems which individually form a right eye image of one of said films and a left eye image of the other of said films, the optical systems further embodying individual beam dividing prism clusters having such a construction that the image seen by the left eye of the observer appears in the same orientation as the image seen by the corresponding eye of the other observer.

Background of the invention

Particularly in the photogrammetric art, when examining a pair of stereofilms or photographs, the point-by-point discussions of the cultural features of said films is retarded or stalled by lack of detailed communication between two observers. This is true when using either hand-held magnifiers obviously but attempts to use dual microscopes or stereoscopes were likewise unsatisfactory for quick and easy examination since the images seen by the two observers did not appear in the same orientation.

In connection with such stereoscopes, some form of non-contacting pointer for use in the field of view is advantageous and the pointer preferably should not obscure any part of said films.

The patents to Hugershoff 1,679,661 (350–138) and Gruner 2,866,382 (88–29) show generally a stereoscope of the kind described herebelow although no apparatus is disclosed to facilitate use by two observers simultaneously.

Summary of the invention

The present invention relates to stereoscopes for viewing a companion or stereo pair of photographs such as aerial photographs, and more particularly the invention relates to a dual viewing stereoscope whereby two observers simultaneously study said stereo pair of photographs.

It is an object of the present invention to provide a dual viewing stereoscope wherein the view which is seen by one eye of one observer is the same as the view seen by the corresponding eye of the second observer.

Another object of the present invention is to provide such a device having the capabilities of changing the interpupillary distance, changing the span between the observation points on the stereo pair of films, and changing the magnification and angular positions of the two images produced by the apparatus.

A still further object of the invention is to provide a lighting system which is susceptible to variations in the kind and distribution of light, and further incorporates a non-contact type of pointer for the field of view.

Further objects and advantages will be apparent in the combination and arrangement of the details of the invention as described in the specification hereinafter and shown in the accompanying drawing.

Description of a preferred embodiment

Figure 1:
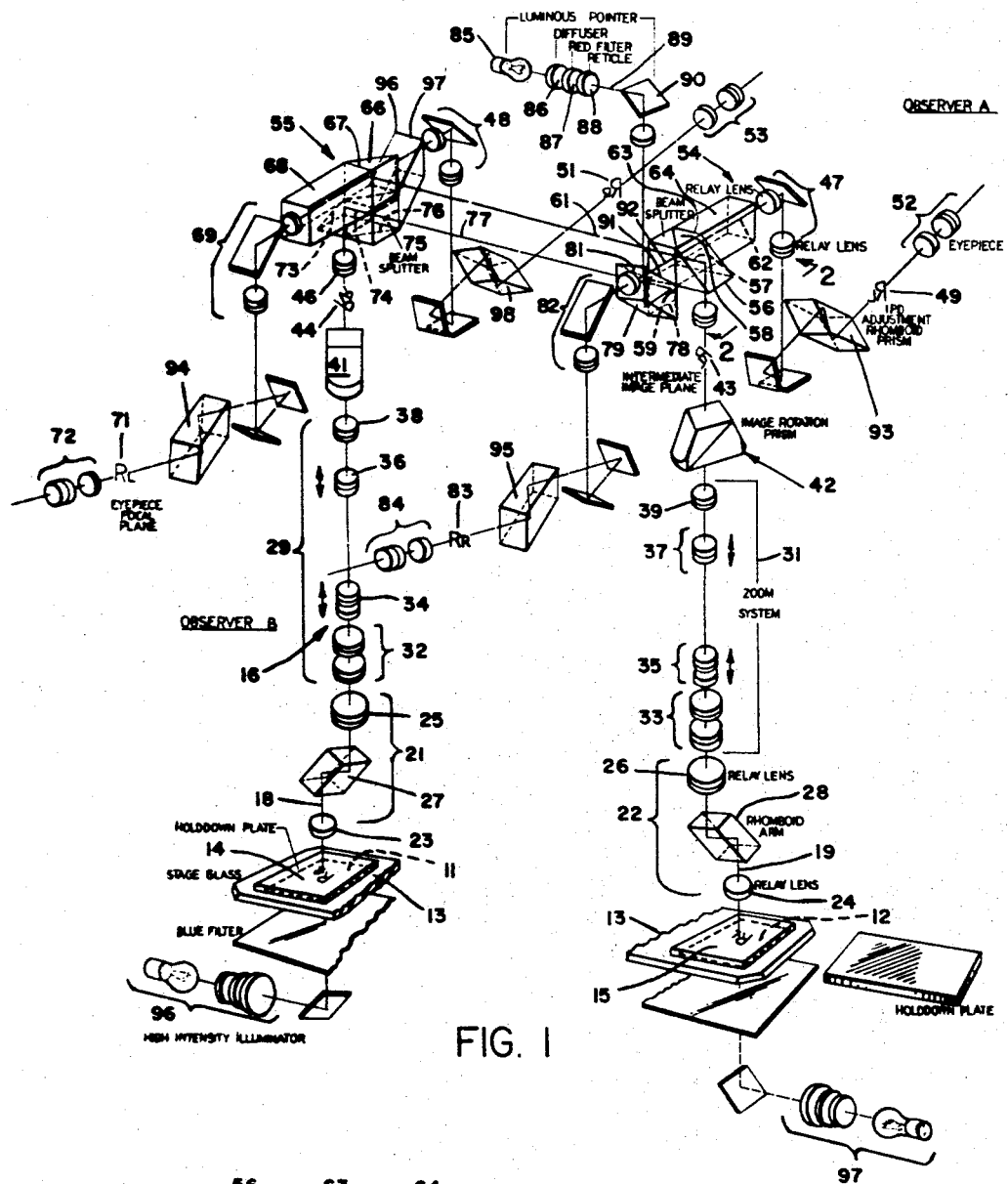
FIG. 1 is a perspective view of an optical diagram representing a preferred form of the present invention.

The dual stereoscope is generally indicated by numeral 10 in FIG. 1 of the drawing and enables two observers (not shown) to view a pair of companion films or transparencies 11 and 12 which are held on a translucent stage plate 13 side-by-side. Preferably the films 11 and 12 are held flat by a pair of transparent glass hold-down plates 14 and 15 which permit individual shifting or repositioning of the respective films.

Said films are viewed by both observers through two integrated and generally similar optical systems 16 and 17 which have nearly the same optical path length, the image seen by the left eye of observer A being the same as the orientation of the image seen by the left eye of observer B.

Comprised in both optical systems 16 and 17 in optical alignment with each other along respective optical axes 18 and 19 in foremost position next to said film are a pair of lower relay lens systems 21 and 22 respectively which project image rays from the aforesaid films rearwardly. Both relay systems 21 and 22 include a front lens numbered 23 and 24 respectively which controls the numerical aperture of the optical systems 16 and 17, and further includes rearwardly thereof a pair of stationary rear relay lenses numbered 25 and 26 respectively which have nearly unit magnification and are so constructed as to reduce the chromatic aberrations in the subsequent images.

Interposed between the front and rear relay lenses in lens systems 16 and 17 is a pair of rhomboidal prisms numbered 27 and 28 respectively which offset the optical axes 18 and 19, and these prisms together with the relay lenses 23 and 24 may be rotatably mounted so as to swing the last-named lenses in an arc over any desired spot on the films 11 and 12.

Aligned rearwardly with the relay lens systems 21 and 22 are a pair of similar zoom optical systems or lens groups 29 and 31 which may be actuated by suitable mechanism, not shown, to vary the magnification of the image formed by the systems.

The magnification range and imaging properties of the zoom lens systems should be carefully matched to each other although the systems need not be of the type shown and described, the magnification range in the preferred form of optical system being 7:1.

Comprised in each of the zoom lens systems 29 and 31 is a stationary objective lens member numbered 32 and 33 respectively which are aligned to receive the image rays from their respective relay lenses. The magnification changing apparatus comprises optically aligned front movable zooming lenses 34 and 35 and rear movable zooming lenses 36 and 37, the relative axial motions of which are so related to the stationary objective members 32 and 33 that the magnification change is continuous and smooth. Comprised most rearwardly in each of the zoom lens groups 29 and 31 is a stationary lens numbered 38 and 39 respectively.

For the purpose of removing unwanted relative angular displacement from the images formed by the objectives 32 and 33 of the films 11 and 12, and to align the stereo base of the images seen in the eyepiece with the eye base, image rotation means are provided rearwardly of lenses 38 and 39 in the form of Pechan prisms which are numbered 41 and 42 respectively. Partly, the need of said Pechan prisms depends on the difference of rotation of the aforesaid images caused by the subsequent prism clusters to be described hereinafter.

Next rearwardly of the Pechan prisms 41 and 42 are formed by the lens groups 29 and 31 a pair of intermediate image planes which are indicated in the drawing by the numerals 43 and 44. It will be seen in the drawing that the images $R_R$ and $R_L$ in the form of the invention illustrated are reversed and reverted with reference to each other and the Pechan prisms stand at about 90° to each other.

Image rays which are projected rearwardly from said intermediate image planes are collected by a pair of field lenses 45 and 46 having weak power and are projected thereby to the upper relay lens systems 47 and 48 which are focused at said image planes. The relay lens systems 47 and 48 form subsequent images respectively at the eyepiece image planes 49 and 51, and a pair of suitable eyepieces 52 and 53 of similar magnification project the images at planes 49 and 51 into the observers' eyes.

*Prism cluster structure*

According to the present invention, a pair of prism clusters 54 and 55 are interposed between each field lens 45 and 46 and its optically aligned upper relay lens system 47 or 48 for the purposes of:

(1) Dividing the beam from each objective lens member to provide a view of one film for one eye of observer A and the same view for the corresponding eye of observer B.

(2) The prism clusters 54 and 55 rotate the images formed by the respective objective lens means 32 and 33 by 90° and this rotation is compensated by the Pechan prisms 41 and 42 respectively.

(3) An optical path length of equality is achieved for the left and right eye of each operator.

(4) Because of the physical separation of the prism clusters 54 and 55, the optical path lengths for observer B are longer than those for observer A. This difference in path length is compensated for by increasing the focal length of those upper relay lens systems which serve operator B by a commensurate amount.

(5) Since the prismatic elements comprised in the line of sight from film 12 are arranged at a different level or layer than the prismatic elements which comprise the line of sight from film 12, all these elements may advantageously be cemented together and form a solid structure which greatly reduces alignment and space problems although the upper and lower layer of the prisms may be left uncemented from each other for adjustment purposes.

It is of interest here to note that the objective lens systems 29 and 31 below the prism clusters 54 and 55 cause rotation of 180° of their images, and the lens systems beyond the prism clusters cause a further 180° of image rotation which then presents the images in normal aspect to the eyes of the observers.

Structurally, the prism cluster 54 comprises a right angle entrance prism 56 which has one of its short sides positioned to receive the vertical image rays coming up from the objective lens means 31. The hypotenuse surface of prism 56 deviates the beam through its other short side thereof along a horizontal optical axis portion 57 into a beam divider cube 58 to which it is preferably cemented.

Across the corners of the cube 58, a beam dividing interface 59 is formed vertically which divides the incident beam into a transmitted beam 61 and a reflected beam directed horizontally along axis portion 62. The reflected beam 62 exits the beam divider cube 58 through a side face 63 thereof into an elongated glass block 64 which is cemented thereto.

Figure 2:
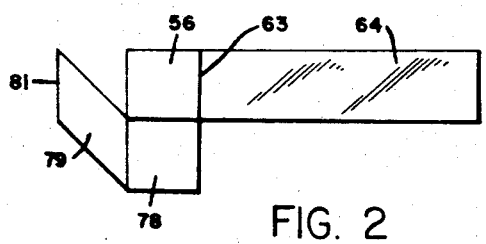
FIG. 2 is a side elevation viewed from the line 2—2 on FIG. 1 showing a part of a prism cluster.

FIG. 2 of the drawing is a side view of prism cluster 54 which more clearly illustrates the upper and lower layer of prisms including the first entrance prism 56, first glass block 64 as well as the fourth entrance prism 78 and rhomboidal prism 79.

Adjacently aligned with the exit surface of the glass block 64 on axis 62 is the aforementioned upper relay lens system 47 which is focused on the intermediate image plane 43 as mentioned heretofore.

It has been pointed out above that the prism clusters 54 and 55 are constructed in two more or less distinct and horizontally aligned upper and lower layers of prisms although the clusters include also diagonal or rhomboidal prisms to offset the transmitted beams.

The aforementioned entrance prism 56 is positioned in the upper layer of prism cluster 54 along with the beam dividing cube 58 and consequently the transmitted beam 61 is projected through air to a second entrance prism 66 in the upper layer of cluster 55. Prism 66 is cemented along one of its short sides 67 to a second elongated glass block 68 through which the transmitted beam is projected lengthwise.

As the transmitted beam leaves the block 68, it enters a second relay lens system 69 located in optical alignment therewith in close proximity to said block. Like the three other relay lens systems, the system 69 includes two relay lenses and a plane mirror interposed therebetween to deviate the line of sight downwardly. Relay lens system 69 serves the left eye of observer B and its focal length is somewhat longer than the focal length of relay system 47 so as to take care of the extra path length in air between the prism clusters 54 and 55 as compared to the path length for the left eye of obeserver A. Relay lens system 69 relays the image from the intermediate image plane 43 to the eyepiece focal plane 71 where an image of the film is formed uprightly and unreverted, the image being subsequently viewed by an eyepiece 72 focused thereon.

With regard to the image rays projected upwardly from film 11, a third right angle entrance prism 73 is provided which receives the beam on a horizontally located short face, the beam being deviated horizontally thereafter by a hypotenuse face thereon along an axis portion 74. The entrance prism is cemented as shown in FIG. 1 to one side of a second beam divider cube 75 which is formed with a semi-reflection filmed interface 76. These elements are located on said lower layer of prisms.

At the interface, the beam is divided to produce a second transmitted beam 77 which travels from the beam dividing cube 75 into the air and enters a fourth right angle entrance prism 78 which may be cemented, if desired, beneath the first beam divider cube 56 as shown in FIG. 2 with its hypotenuse face in substantial alignment with the interface 59 on the cube 58.

The hypotenuse face of the fourth entrance prism 78 deviates the transmitted beam 77 at 90° as the beam leaves said prism through the other short face thereof to which a rhomboidal prism 79 is cemented, the exit surface 81 of said prism 79 being displaced upwardly from its entrance surface so as to offset the beam and bring it out at the level of the emergence of the beam 61 from the glass block 68.

It will be noted that the beam divider 75 and fourth entrance prism 78 both are considered to lie in the lower layer of prisms of the prism clusters 54 and 55.

The transmitted beam 77 upon emergence from the exit surface 81 enters an optically aligned fourth relay lens system 82 which is similar in all respects to the second relay lens system 69 and includes a mirror which deviates the beam downwardly. Said relay system 82 relays the image formed at the intermediate image plane 44 to the eyepiece focal plane 83 where the eyepiece 84 picks up the image and presents it to the right eye of observer B.

In FIG. 1 of the drawing, the legends $R_L$ and $R_R$ at the image planes 71 and 83 respectively show the angular orientation of the images to be upright and unreverted.

A further advantageous feature as mentioned heretofore is the non-contact reticle or object finder or marker device which is provided in the form of a colored bright dot formed in the field of view of the left eye of both observers A and B.

The object marker device as shown in FIG. 1 comprises a lamp 85, a diffuser plate 86, a bright colored filter plate 87 and an opaque aperture plate 88, all of which are aligned on a common axis 89 which is deviated by an inclined mirror 90 vertically onto the inclined upper surface 91 on prism 79. Inclined surface 91 is reflectively coated and the axis 89 is so aligned that the reflected colored beam 98 is projected upon the beam divider surface 59 at the point where the beam is divided.

The optical path length from the luminous reticle plate 88 to the last-mentioned point is conjugate to the optical distance from said point to the relay lens system 47 so that the system 47 forms a floating image of the reticle plate 88 in the field of view of the left eye of the observer A, and relay lens 69 forms said image in the left eye of observer B.

When either operator desires to call attention to a particular area of the films 11 and 12, he merely moves the films manually until the luminous dot coincides with the desired area.

In the eyepiece end of the instrument, the rhomboidal prisms 92, 93, 94, 95 are provided to alter the interpupillary distance of observers A and B.

Diascopic illumination of films 11 and 12 is provided as shown in the drawing by the illumination units 96 and 97 respectively, although other means of illumination such as episcopic illumination may be used, if desired.

It will be observed in the foregoing description that there is here provided a stereoscope for viewing two similar photographs, the optical apparatus thereof presenting to two observers simultaneously the same image in corresponding eyes. In fulfilment of the objects of the present invention, it will be realized that the optical alignment of the component optical systems is cooperatively and reliably accomplished by the form and combination of the prism clusters 54 and 55, the structure thereof being such as to provide the necessary orientation of the images seen while being strong and compact.

Although said structure has been shown in only a preferred form, modifications and changes may be effected therein without departing from the spirit of the invention as set forth in the claims here appended.

I claim:

1. In a pair of integrated microscope optical systems for a dual viewing stereoscope wherein two observers may obtain exactly the same view of a stereo pair of films, said systems having the combination of a stereo pair of similar flat films mounted at the same level and spaced apart, objective lens means aligned on a pair of optical axes which are directed at corresponding points on the respective films and forms images thereof at an intermediate image plane on each axis, a pair of upper relay lens systems, each one being focused on one of said image planes to form a subsequent image at a rearward eyepiece image plane, an eyepiece aligned on each of said axes and constructed to present the last said image to the eye of the observer, a first prism cluster embodying a beam divider for simultaneously serving viewer A and viewer B and having in combination a first right angle prism positioned to receive the vertical image rays from one said field lens on one of its right angle sides and be deflected subsequently from its hypotenuse side through the other short side horizontally, a beam dividing cube cemented onto the exit side of the first right prism in position such that the beam dividing surface cuts vertically and diagonally across the entering beam and deviates a reflected part of the beam horizontally through a first exit face of the beam dividing cube, the transmitted part of the beam traveling straight through a second exit face of the cube, an elongated rectangular block of glass cemented at one end to said first exit surface of said cube in position to conduct the reflected part of said beam lengthwise thereof along the optical axis of one of said eyepieces used by observer A, a second prism cluster for serving viewer A and viewer B and having in combination a second right angle prism spaced away from said second exit face of the aforesaid cube and having an entrance face parallel thereto, the hypotenuse face of the last said right angle prism being substantially vertical and inclined to the entrance face to deviate the entrant rays through its exit face at ninety degrees thereto, a second rectangular glass block on which an end optical entrance face is formed and whereon the last said exit face is cemented, said block having an optical exit face formed on the other end through which the image rays pass into one of the eyepieces for observer B on the same relative side as observer A so that both observers see the same picture with the same eye, the second prism cluster further having in combination a third right angled prism located to receive the beam from the other of said field lenses through a horizontal entrance face formed thereon, said beam being deviated ninety degrees by the hypotenuse surface of the prism horizontally through a vertical flat exit face formed thereon, a second beam dividing cube having a vertical entrance face whereon the last-mentioned face is cemented, and having a beam dividing surface formed vertically in the cube diagonally of the entering beam so that the transmitted portion of the beam passes out of the cube in the direction of the first prism cluster, the reflected portion of the beam being deviated through a vertical side face which joins the entrance and exit surfaces of the cube, said cube being cemented to the undersurface of said second right angle prism, the beam dividing surface of the cube being substantially parallel to the hypotenuse surface of said prism, the reflected beam being deviated through an exit face formed on said cube, a first rhomboidal prism having an oblique entrance face and an exit face substantially formed parallel thereto on opposite ends, the entrance face thereof being cemented onto the last-mentioned exit face so as to offset and deviate the partial beam along the optical axis of the eyepiece which serves the opposite eye of observer A, the first prism cluster further having in combination a fourth right angle prism having its top triangular surface cemented beneath said first beam dividing cube so that its hypotenuse face is substantially coplanar with the beam dividing surface, the beam which emerges into air from the second beam divider entering the fourth right angle prism and being deviated by its hypotenuse surface through the adjacent exit surface thereon, and a second rhomboidal prism having oblique and parallel entrance and exit faces which are longitudinally offset from each other, the entrance face of said prism being cemented to the exit surface of the fourth right angle prism, the transmitted beam which emerges into air from the second beam divider entering the fourth right angle prism horizontally and being deviated by its hypotenuse surface into said rhomboidal prism and emerging horizontally therefrom in optical alignment with the other eyepiece used by observer B, the composition and arrangement of the first and second prism clusters as above specified serving to provide the same viewing aspect of the stereo pair of transparencies for the two operators with respect to both eyes.

2. In a pair of integrated microscope optical systems for a dual viewing stereoscope wherein two observers may obtain exactly the same view of corresponding areas of a stereo pair of films, said systems having the combination of a translucent stage plate whereon a stereo pair of photographic films is held in similar orientation in spaced relation to each other, means for diascopically illuminating said films, a pair of optical axes on which the optical members of said pair of optical systems are aligned, a lower relay lens system located on each of said axes including a front collective lens, a rear achromatizing lens and an interposed rhomboidal prism having laterally offset entrance and exit faces aligned respectively with the front and rear lenses, the front lens and the prism being swingably mounted above the axis of the rear lens, a zoom type lens system located next rearwardly of the relay system on each of said axes, the zoom systems being substantial duplicates which form an image of variable magnification of the films in the same manner, means located next rearwardly of said zoom optical systems in each of said axes for rotating the images formed by the zoom systems, said images being formed rearwardly of and adjacent to the last said means, an upper relay lens system aligned on each of said pair of axes and focused on one of said image planes to form a subsequent image at a rearward eyepiece image plane, an eyepiece aligned on each of said axes and constructed to relay the last said image to the eye of the observer, a first prism cluster for simultaneously serving viewer A and viewer B and having in combination, a first right angle prism positioned to receive the vertical image rays from one said field lens on one of its right angle sides and be deflected subsequently from its hypotenuse side through the other short side horizontally, a beam dividing cube cemented onto the exit side of the first right prism in position such that the beam dividing surface cuts vertically and diagonally across the entering beam and deviates a reflected part of the beam horizontally through a first exit face of the beam dividing cube, the transmitted part of the beam traveling straight through a second exit face of the cube, an elongated rectangular block of glass cemented at one end to said first exit surface of said cube in position to conduct the reflected part of said beam lengthwise thereof along the optical axis of one of said eyepieces used by observer A, a second prism cluster for serving viewer A and viewer B and having in combination, a second right angle prism spaced away from said second exit face of the aforesaid cube and having an entrance face parallel thereto, the hypotenuse face of the last said right angle prism being substantially vertical and inclined to the entrance face to deviate the entrant rays through its exit face at ninety degrees thereto, a second rectangular glass block on which an end optical entrance face is formed and whereon the last said exit face is cemented, said block having an optical exit face formed on the other end through which the image rays pass into one of the eyepieces for observer B on the same relative side as observer A so that both observers see the same picture with the same eye, the second prism cluster further having in combination a third right angled prism located to receive the beam from the other of said field lenses through a horizontal entrance face formed thereon, said beam being deviated ninety degrees by the hypotenuse surface of the prism horizontally through a vertical flat exit face formed thereon, a second beam dividing cube having a vertical entrance face whereon the last-mentioned face is cemented, and having a beam dividing surface formed vertically in the cube, diagonally of the entering beam so that the transmitted portion of the beam passes out of the cube in the direction of the first prism cluster, the reflected portion of the beam being deviated through a vertical side face which joins the entrance and exit surfaces of the cube, said cube being cemented to the undersurface of said second right angle prism, the beam dividing surface of the cube being substantially parallel to the hypotenuse surface of said prism, the reflected beam being deviated through an exit face formed on said cube, a first rhomboidal prism having an oblique entrance face and an exit face substantially formed parallel thereto on opposite ends, the entrance face thereof being cemented onto the last-mentioned exit face so as to offset and deviate the partial beam along the optical axis of the eyepiece which serves the opposite eye of observer A, the first prism cluster further having in combination a fourth right angle prism having its top triangular surface cemented beneath said first beam dividing cube so that its hypotenuse face is substantially coplanar with the beam dividing surface, the beam which emerges into air from the second beam divider entering the fourth right angle prism and being deviated by its hypotenuse surface through the adjacent exit surface thereon, and a second rhomboidal prism having oblique and parallel entrance and exit faces which are longitudinally offset from each other, the entrance face of said prism being cemented to the exit surface of the fourth right angle prism, the transmitted beam which emerges into air from the second beam divider entering the fourth right angle prism horizontally and being deviated by its hypotenuse surface into said rhomboidal prism and emerging horizontally therefrom in optical alignment with the other eyepiece used by observer B, the composition and arrangement of the first and second prism clusters as above specified serving to provide the same viewing aspect of the stereo pair of transparencies for the two operators with respect to both eyes.

3. In a pair of integrated microscope optical systems for a dual viewing stereoscope wherein two observers may obtain exactly the same view of corresponding areas of a stereo pair of films, said systems having the combination of a translucent stage plate whereon a stereo pair of photographic films is held in similar orientation in spaced relation to each other, means for diascopically illuminating said films, a pair of optical axes on which the optical members of said pair of optical systems are aligned, a lower relay lens system located on each of said axes including a front collective lens, a rear achromatizing lens and an interposed rhomboidal prism having laterally offset entrance and exit faces aligned respectively with the front and rear lenses, the front lens and the prism being swingably mounted about the axis of the rear lens, a zoom type lens system located next rearwardly of the relay system on each of said axes, the zoom systems being substantial duplicates which form an image of variable magnification of the films in the same manner, means located next rearwardly of said zoom optical systems in each of said axes for rotating the images formed by the zoom systems, said images being formed rearwardly of and adjacent to the last said means, an upper relay lens system aligned on each of said pair of axes and focused on one of said image planes to form a subsequent image at a rearward eyepiece image plane, an eyepiece aligned on each of said axes and constructed to relay the last said image to the eye of the observer, a first prism cluster for simultaneously serving viewer A and viewer B and having in combination, a first right angle prism positioned to receive the vertical image rays from one said field lens on one of its right angle sides and be deflected subsequently from its hypotenuse side through the other short side horizontally, a beam dividing cube cemented onto the exit side of the first right prism in position such that the beam dividing surface cuts vertically and diagonally across the entering beam and deviates a reflected part of the beam horizontally through a first exit face of the beam dividing cube, the transmitted part of the beam traveling straight through a second exit face of the cube, an elongated rectangular block of glass cemented at one end to said first exit surface of said cube in position to conduct the reflected part of said beam lengthwise thereof along the optical axis of one of said eyepieces used by observer A, a second prism cluster for serving viewer A and viewer B and having in combination, a second right angle prism spaced away from said second exit face of the aforesaid cube and having an entrance face parallel thereto, the hypotenuse face of the last said right angle prism being substantially vertical and inclined to the entrance face to deviate the entrant rays through its exit face at ninety degrees thereto, a second rectangular glass block on which an end optical entrance face is formed and whereon the last said exit face is cemented, said block having an optical exit face formed on the other end through which the image rays pass into one of the eyepieces for observer B on the same relative side as observer A so that both observers see the same picture with the same eye, the second prism cluster further having in combination a third right angled prism located to receive the beam from the other of said field lenses through a horizontal entrance face formed thereon, said beam being deviated ninety degrees by the hypotenuse surface of the prism horizontally through a vertical flat exit face formed thereon, a second beam dividing cube having a vertical entrance face whereon the last-mentioned face is cemented, and having a beam dividing surface formed vertically in the cube, diagonally of the entering beam so that the transmitted portion of the beam passes out of the cube in the direction of the first prism cluster, the reflected portion of the beam being deviated through a vertical side face which joins the entrance and exit surfaces of the cube, said cube being cemented to the undersurface of said second right angle prism, the beam dividing surface of the cube being substantially parallel to the hypotenuse surface of said prism, the reflected beam being deviated through an exit face formed on said cube, a first rhomboidal prism having an oblique entrance face and an exit face substantially formed parallel thereto on opposite ends, the entrance face thereof being cemented onto the last-mentioned exit face so as to offset and deviate the partial beam along the optical axis of the eyepiece which serves the opposite eye of observer A, the first prism cluster further having in combination a fourth right angle prism having its top triangular surface cemented beneath said first beam dividing cube so that its hypotenuse face is substantially coplanar with the beam dividing surface, the beam which emerges into air from the second beam divider entering the fourth right angle prism and being deviated by its hypotenuse surface through the adjacent exit surface thereon, and a second rhomboidal prism having oblique and parallel entrance and exit faces which are longitudinally offset from each other, the entrance face of said prism being cemented to the exit surface of the fourth right angle prism, the transmitted beam which emerges into air from the second beam divider entering the fourth right angle prism horizontally and being deviated by its hypotenuse surface into said rhomboidal prism and emerging horizontally therefrom in optical alignment with the other eyepiece used by observer B, the composition and arrangement of the first and second prism clusters as above specified serving to provide the same viewing aspect of the stereo pair of transparencies for the two operators with respect to both eyes, and a light source located in optical alignment with said upper relay lens system, means forming an opaque apertured diaphragm which is optically aligned with said source, said diaphragm being fixed at a distance from one of said upper relay lens systems equal to its focal length whereby a luminous dot appears to be superimposed on the film seen by the left eye of each observer.

References Cited

UNITED STATES PATENTS

| | | | |
|---|---|---|---|
| 1,679,661 | 8/1928 | Hugershoff | 350—138 |
| 2,674,152 | 4/1954 | Wilkinson | 350—36 |
| 2,866,382 | 12/1958 | Gruner et al. | 350—136 |
| 3,062,099 | 11/1962 | French | 350—137 X |
| 3,186,300 | 6/1965 | Littmann | 350—36 X |
| 2,444,815 | 7/1948 | Edison | 350—136 X |

DAVID SCHONBERG, *Primary Examiner.*

P. R. GILLIAM, *Assistant Examiner.*

U.S. Cl. X.R.

350—34, 35, 36, 51, 54, 75